United States Patent

George

[15] 3,636,453

[45] Jan. 18, 1972

[54] CONCURRENT SAME-FREQUENCY FM RADIO REPEATER

[72] Inventor: Quintin H. George, Sudbury, Mass.

[73] Assignee: Cutler-Hammer, Incorporated, Milwaukee, Wis.

[22] Filed: May 7, 1969

[21] Appl. No.: 822,541

[52] U.S. Cl. ....................325/7, 325/8, 343/6.8, 331/55, 331/153

[51] Int. Cl. ....................H04b 7/14

[58] Field of Search ....................325/8, 21, 23, 24, 12, 6, 11, 325/7; 343/180, 6.8; 179/170; 330/4.5; 331/55, 153

[56] References Cited

UNITED STATES PATENTS

| | | | |
|---|---|---|---|
| 3,566,234 | 2/1971 | Thomson | 325/7 |
| 3,304,518 | 2/1967 | Mackey | 331/55 |
| 3,127,603 | 3/1964 | Kramer | 325/9 |
| 2,875,328 | 2/1959 | Hare et al. | 325/11 |
| 3,460,040 | 8/1969 | Jacob | 325/6 |
| 3,117,277 | 1/1964 | Magondeaux | 325/6 |

*Primary Examiner*—Benedict V. Safourek
*Assistant Examiner*—Richard P. Lange
*Attorney*—Henry Huff

[57] ABSTRACT

An antenna system, used for simultaneous reception and transmission, is coupled by way of a hybrid device to an RF amplifier having less gain than the isolation loss introduced between its output and input by the hybrid. Additional gain, beyond the finite isolation of the hybrid, is provided by an oscillator which is coupled in single-port fashion to the circuit and tends to synchronize with applied signals that are substantially weaker than its output.

3 Claims, 2 Drawing Figures

INVENTOR.
QUINTIN H. GEORGE

BY Henry Huff
ATTORNEY.

CONCURRENT SAME-FREQUENCY FM RADIO REPEATER

BACKGROUND

1. Field

The invention pertains to FM radio repeaters, which are systems for receiving weak FM radio signals and simultaneously transmitting similar signals, carrying the same modulation, at a substantially higher power level.

2. Prior Art

Prior art radio repeaters generally include an RF amplifier, an antenna system for receiving the weak signal to be repeated and for transmitting the amplified signal, and some form of signal-processing means to prevent feedback of the transmitted signal through the amplifier. The signal-processing means may be a frequency converter; the amplifier signal is transmitted concurrently with the reception of the weak signal, but on a different carrier frequency. This arrangement requires the allocation of two distinct frequency channels to each repeater. Other signal-processing techniques use a single channel alternately for transmission and reception. However, the required high switching speed tends to spread the spectrum of the repeated signal into adjacent channels, and the implementation is complex.

Another approach is the use of separate directive antennas for transmission and reception in respective different, for example opposite, directions, coupled to the output and input of the RF amplifier. This requires only a single channel, but the gain of the amplifier must be less than the isolation afforded by the antenna directivity.

According to this invention, the amplification of a signal to be repeated is provided by the combination of an RF amplifier and an injection-locked oscillator which contributes substantially to the overall gain of the system without inducing regenerative feedback oscillation of the RF amplifier. The input and output of the RF amplifier are isolated from each other to a considerable degree, for example 50 db., by means of a hybrid device. The gain of the amplifier must be less than the isolation loss to prevent oscillation. The injection-locked oscillator is coupled in single port fashion to a point in the loop that includes the RF amplifier, and provides additional gain without affecting the stability of the loop. Thus the total system gain of the repeater may substantially exceed the isolation loss.

In a simple embodiment of the invention, the oscillator is arranged to operate at the frequency of the RF signal to be repeated. In another embodiment, the oscillator operates in a relatively narrow frequency band equivalent to a single communication channel, and frequency converters are employed to translate the received signal to that band and back to the original frequency after amplification by the oscillator action. This arrangement enables the repeater to be selectively tuned to any of a number of communication channels while maintaining operation of the oscillator under optimum conditions.

DRAWING

Figure 1:
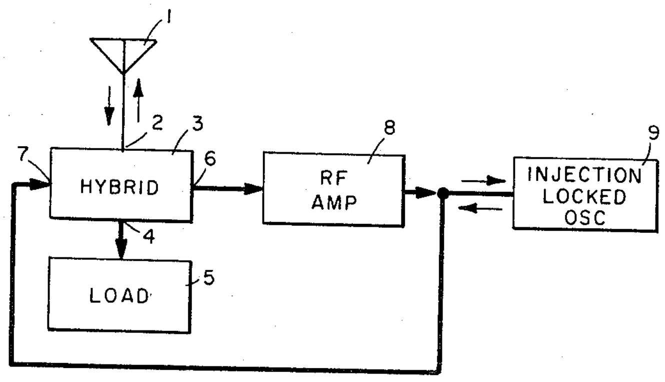
Figure 2:
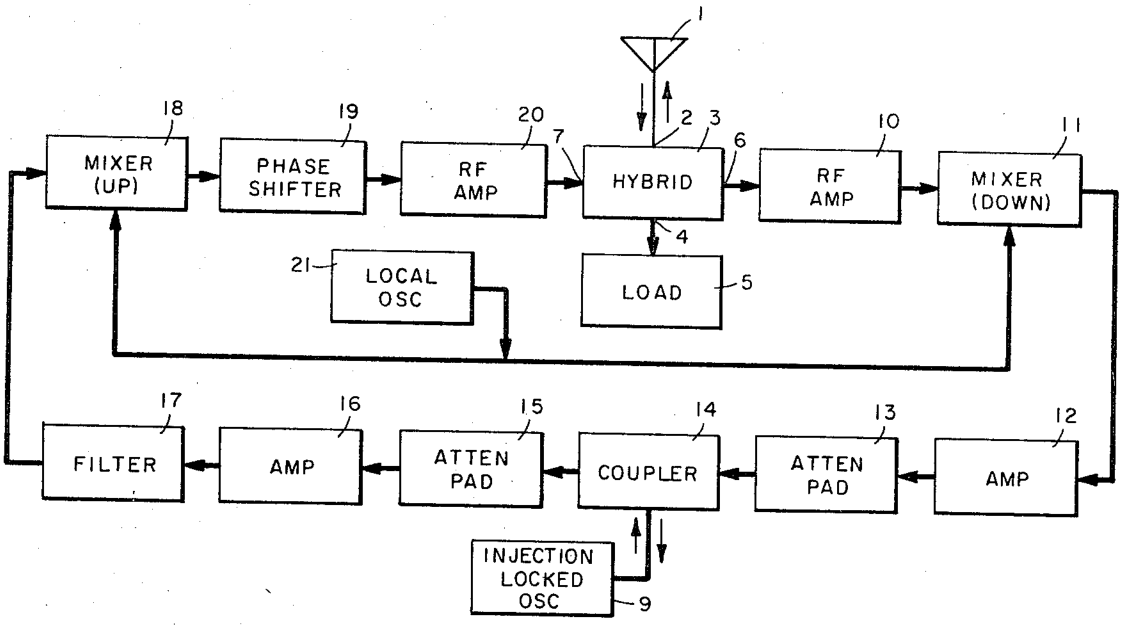

FIG. 1 is a block diagram of a radio repeater embodying the invention in its essentially basic form, and FIG. 2 is a block diagram of a more complex embodiment adopted for selective channel operation and including means for optimizing the circuit characteristics confronting the injection-locked oscillator.

DESCRIPTION

Referring to FIG. 1, an antenna 1 is coupled to one port 2 of a hybrid device 3, which may be of any known type appropriate to the frequency range of interest; for example a transmission line bridge, a magic T, or a 3 db. directional coupler. The port 4 of the hybrid is coupled to a load 5, designed to simulate the impedance of the antenna 1 to a practical degree of approximation.

The other two ports 6 and 7 of the hybrid are coupled respectively to the input and output of an RF amplifier 8. In order to prevent self-excited oscillation, the gain of the amplifier 8 must be less than the isolation loss provided by the hybrid 3 between its ports 7 and 6. The loss depends principally upon how well the load 5 matches the antenna 1. Assuming a typical isolation of 50 db., the gain of the amplifier 8 should be about 45 db.

The system thus far described will operate as a same-frequency concurrent repeater. A signal received by the antenna 1 enters port 2 of the hybrid 3, undergoing a 3 db. loss in its passage to port 6. After 45 db. gain in the amplifier 8, and another 3 db. loss between port 7 and port 2 of the hybrid, the signal appears at the antenna 1 with a net gain of approximately 39 db., and is radiated as an amplified replica of the signal being received.

The output of the amplifier 8 appears at port 6, with an attenuation of about 50 db. introduced by the hybrid isolation between ports 7 and 6. Because the open loop gain is less than unity, minus 5 db. in this example, the closed loop cannot oscillate under any condition. There is feedback, which may cause the closed loop gain to be somewhat more or less than 39 db., depending upon the total phase shift around the loop. However, the maximum usable gain of the amplifier, operating in a practical repeater system, is absolutely restricted to something less than the hybrid isolation.

If the RF signals to be repeated are frequency modulated, the above limitation can be substantially exceeded without instability by adding power to the RF signal, as distinguished for amplifying the signal. The terms "frequency modulated" and "FM" as used herein are intended to include discontinuous or discrete frequency variations, for example frequency shift keying (FSK), as well as continuous variations typical of frequency modulation by an audio or other analog representation of information.

Returning to the description of the system of FIG. 1, an injection-locked oscillator 9 is coupled to a point in the loop between the hybrid ports 6 and 7; in this illustration, to a point between the output of amplifier 8 and the hybrid port 7. The oscillator 9 is designed to be susceptible to synchronization with incident signals that differ in frequency from the free-running frequency of the oscillator, and to provide output at a relatively constant power level substantially higher than that required to synchronize it.

Such oscillators are called injection-locked oscillators, and are characterized by low-Q frequency-determining means, such as a heavily dissipatively loaded tank circuit. For example, the oscillator 9 may be a known type of circuit comprising a negative resistance device such as a tunnel diode and a resonant circuit with resistive loading only moderately less than equivalent in effect to the negative resistance of the diode.

The operation of the system of FIG. 1, as modified by the oscillator 9, is as follows. In the absence of any external RF signal received by the antenna 1, the oscillator 9 operates continuously at its free-running frequency, $f_0$ producing an output power of say 1 milliwatt, 0 dbm. Half of this power, −3 dbm., is applied to the antenna and radiated as an idle signal. If such idle signal is undesired, it may be prevented by means which are not part of this invention.

A frequency-modulated signal received by the antenna 1 will be attenuated 3 db. by the hybrid, and amplified 45 db. by amplifier 8. A major part of the amplifier output will return to port 7 of the hybrid, encounter a further 3 db. attenuation, and be reapplied to the antenna as previously described.

A small part of the amplifier output is absorbed by the oscillator 9, which locks to and follows the frequency variations of the received signal. The oscillator output simply adds to that of the amplifier, and is applied with it to the antenna 1 by way of the hybrid 3. The amount of additional power depends only upon the output capability of the oscillator 9 and is independent of the power output level of the amplifier 8, assuming the latter is sufficient to cause synchronization. The open loop gain is the same regardless of the presence or absence of the oscillator 9, −5 db. in the present example. The closed loop cannot oscillate, notwithstanding the fact that the total power supplied to the antenna may be substantially greater than the output of the amplifier 8 alone.

As a numerical example, assume that an FM signal received by the antenna 1 supplies a power of −60 dbm. to hybrid port 2. The level at port 6 is −63 dbm., and at the output of amplifier 8 is −18 dbm. The oscillator synchronizes with the amplifier output signal, producing a replica of the received signal at a power level of 0 dbm. This, in addition to the relatively negligible output of the amplifier, appears at port 2 of the hybrid at a level of −3 dbm.

The overall effective gain of the repeater system is 57 db., substantially more than the hybrid isolation. The actual gain around the loop from the input of amplifier 8 to the output of hybrid port 6 is less than unity, and the loop is stable. The apparent paradox is explained by the observation that the oscillator 9 contributes no actual gain in the sense of amplification, but does contribute useful power.

The illustrative system of FIG. 1 is preferred for some applications. However it is subject to certain limitations; the bandwidth of the amplifier 8 must be narrow enough to pass only a desired communication channel, or group of contiguous channels, and its output impedance may include reactive components that affect the operation of the oscillator 9, particularly if the tuning of the amplifier is made adjustable to accommodate selectively different channels. Also, some of the output of the oscillator 9 returns to it by way of the hybrid 3 and amplifier 8, causing a tendency toward self-locking and reducing its susceptibility to frequency capture by the FM signal.

Referring to FIG. 2, the antenna 1, hybrid 3, load 5 and oscillator 9 are substantially identical in design and operation with the correspondingly designated elements of FIG. 1, except that the free-running frequency of the oscillator 9 is lower than that of any external radio signal to be repeated by the system. The circuit between hybrid ports 6 and 7 includes, in cascade, an RF amplifier 10, mixer 11, a lower frequency fixed tuned RF or IF amplifier 12, an attenuator pad 13, a coupler 14, another pad 15, amplifier 16, filter 17, a second mixer 18, a phase shifter 19 and RF amplifier 20. Filter 17 passes the appropriate frequency band, and may in practice be incorporated in the amplifier 16.

Attenuator pads 13 and 15 may be simple resistive networks of known type. The coupler 14 may be a network of three resistors connected to a common junction point, or a device similar to the hybrid 3, for example. One terminal or port of the coupler 14 is connected to the oscillator 9. The purpose of pads 13 and 15, and coupler 14, is to reduce frequency —dependent variations in the impedance presented to the oscillator 9.

RF amplifiers 10 and 20 are designed to operate throughout the frequency band of interest. Amplifier 10 is a low-level device, analogous to the RF stage of a superheterodyne receiver, and amplifier 20 is a relatively high-level device, analogous to the final stage of a radio transmitter.

A common local oscillator 21 is coupled to both mixers 11 and 18. Mixer 11 is designed to operate as a down converter, like the converter of an ordinary superheterodyne. Mixer 18 is designed in known manner to act as an up converter. Amplifiers 12 and 16 are essentially the same in function and design as the IF amplifiers, or amplifier stages, of a standard communications receiver.

The operating of the system of FIG. 2 is as follows. Assume that it is desired to repeat an FM signal $f_r \pm\Delta f$ and that the center of the pass band of amplifiers 12 and 16 and filter 17 is at $f_0$The local oscillator is adjusted to a frequency $f_m$ such that $f_m - f_r = f_0$. The modulation component which is selected as the output of mixer 11 is an FM signal $f_o \pm\Delta f$ centered at $f_o$ and modulated like the received RF signal to be repeated.

The mixer output, after amplification in amplifier 12 and attenuation in pad 13 and coupler 14, is applied to the oscillator 9. The free-running frequency of the oscillator 9 is $f_0$. The oscillator 9 is captured by the incident signal $f_o \pm\Delta f$and produces a replica of that signal at a constant power level, substantially as described with reference to FIG. 1. Because the free-running frequency of the oscillator 9 is the same as the center frequency of the incident FM signal, the locking gain, i.e., the ratio between the output power and the incident power required for locking, can be very high.

The output of oscillator 9 is attenuated in the coupler 14 and pad 15, amplifier in amplifier 16, then applied to the mixer 18. The modulation component which is selected as the output of mixer 18 is the sum frequency $f_m + f_o \pm\Delta f$ which is the same as the received signal $f_r \pm\Delta f$. This mixer output passes through phase shifter 19, which may be adjusted as will be described, is amplified in amplifier 20, applied to port 7 of the hybrid 3, and radiated by the antenna 1.

As in the system of FIG. 1, the total open loop gain, taking into account the amplifier gains, conversion gains or losses, the losses in attenuators 13 and 15 and coupler 14, and the isolation loss between hybrid ports 7 and 6 must be less than unit. The net gain between hybrid port 6 and oscillator 9 should be sufficient to ensure locking in response to the weakest received signal to be repeated. The losses in attenuators 13 and 15, and in coupler 14, are incidental to the function of presenting a favorable impedance environment to the oscillator 9, and are counteracted as necessary by providing sufficient gain in the amplifier 12 and 16.

The total phase shift around the loop, including that introduced by the phase shifter 19, will have only a small effect on the gain from hybrid port 6 around to port 7 because the hybrid isolation keeps the loop gain below unity. However, any total phase shifter other than zero or an integral multiple of 360° will present a reactance to the oscillator 9, which may stop tracking or stop oscillating under unfavorable reactive loading. The phase shifter 19 is adjusted to avoid such loading in the operating frequency range.

The performance of the overall repeater system of FIG. 2 is much like that of FIG. 1, but improved in that an individual communication channel can be selected and others excluded, by adjustment of the local oscillator 21, and in that the injection locked oscillator 9 is always operated near its free-running frequency, and with near optimum loading, with consequent maximization of effective system gain.

I claim:

1. A concurrent same-frequency repeater for receiving, amplifying, and retransmitting frequency-modulated radio signals, comprising:

a. a radiofrequency hybrid having two pairs of respectively conjugate ports,
b. an antenna system coupled to one of said ports,
c. a matching network coupled to the port that is conjugate to the one to which said antenna is coupled, and designed to simulate the impedance of said antenna system,
d. a radiofrequency amplifier having input and output terminals coupled respectively to the other conjugate pair of ports, the gain of said amplifier being less than the hybrid isolation between said last-mentioned ports, and
e. an injection-locked oscillator coupled to a point in the circuit between said last-mentioned ports, said oscillator having a tendency to synchronize with radiofrequency signals at said point that are substantially weaker than the output of said oscillator.

2. The invention set forth in claim 1, wherein the path between said two parts that includes said amplifier further includes:

a. first and second mixers,
b. means for coupling the output of said first mixer to the input of the second, including a band pass filter designed to pass the free running frequency of said injection locked oscillator and a band of frequencies in the vicinity thereof,
c. a common local oscillator coupled to both said mixers,
d. one of said mixers including means for selecting its difference frequency product as its output and the other of said second mixers including means for selecting its sum frequency product as its output, and
e. means for coupling said injection-locked oscillator to a point in said circuit between said first and second mixers.

3. The invention set forth in claim 2, wherein said path between said two ports further includes a phase shifter.

* * * * *